(12) United States Patent
Isobe et al.

(10) Patent No.: US 7,472,622 B2
(45) Date of Patent: Jan. 6, 2009

(54) LINKAGE SYSTEM

(75) Inventors: Hiroshi Isobe, Shizuoka-ken (JP);
Keisuke Sone, Shizuoka-ken (JP);
Tomomi Ishikawa, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 781 days.

(21) Appl. No.: 10/986,455

(22) Filed: Nov. 12, 2004

(65) Prior Publication Data
US 2005/0159075 A1   Jul. 21, 2005

(30) Foreign Application Priority Data
Nov. 18, 2003   (JP) .............................. 2003-388307

(51) Int. Cl.
*B25J 17/00* (2006.01)
(52) U.S. Cl. .................. 74/490.06; 74/490.05; 901/27; 901/28; 901/29; 414/729
(58) Field of Classification Search ............. 74/490.06, 74/490.01, 490.05; 901/27, 28, 29, 15; 414/729, 414/735
See application file for complete search history.

(56) References Cited

U.S. PATENT DOCUMENTS

| | | | | |
|---|---|---|---|---|
| 5,893,296 A | * | 4/1999 | Rosheim | 74/490.03 |
| 5,979,264 A | * | 11/1999 | Rosheim | 74/490.06 |
| 6,105,455 A | * | 8/2000 | Rosheim | 74/490.06 |
| 6,196,081 B1 | * | 3/2001 | Yau | 74/479.01 |
| 6,418,811 B1 | * | 7/2002 | Rosheim | 74/490.06 |

* cited by examiner

*Primary Examiner*—David M Fenstermacher
(74) *Attorney, Agent, or Firm*—Arent Fox LLP

(57) ABSTRACT

A linkage system which offers high rigidity and good assemblability and producibility, and enables parts such as rotary transmission components and actuators to be readily installed. A linkage system includes an input member disposed on an input side, an output member disposed on an output side, and three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link. The link mechanism being geometrically identical with respect to a center cross-sectional plane relative on the input and output sides. Each of the revolute joints of the link mechanism includes bearings that support at both ends of the revolute joint.

22 Claims, 6 Drawing Sheets

LINKAGE SYSTEM

BACKGROUND OF THE INVENTION

1. Field of the Invention

The present invention relates to a linkage system used, for example, for a joint of an articulated robot that performs complex processing or handling of goods in a three-dimensional space at high speed and with high precision.

2. Description of the Related Art

For example, Japanese Patent Laid-Open Publication No. 2000-94245 discloses a linkage system with a parallel link mechanism that performs complex processing or handling of goods in a three-dimensional space at high speed and with high precision.

The parallel link mechanism adopted in such a linkage system includes a plurality of links that connect a base plate and a traveling plate and cooperatively extend and retract to change the position and orientation of the traveling plate relative to the base plate. Tool is attached to the traveling plate of the parallel link mechanism, while a workpiece is held on a table which is designed rotatable so that the tool can freely change its position and orientation relative to the workpiece on the table and perform complex processing or handling of goods by the tool on a three-dimensional basis.

Characteristic features of such a parallel link mechanism are that the weight of the movable parts can be reduced, and positioning errors of several links are evened-out at the distal ends, both of which are advantageous for the complex, high-speed, and high-precision processing or handling of goods in the three-dimensional space.

On the other hand, if the operating range of the traveling plate needs to be increased in the parallel link mechanism, the links have to be extended because each link has a relatively small operating angle range, and the entire mechanism and then the system itself become bulky. Further, because of relatively low rigidity of the entire mechanism, the weight of the tool, or the load capacity of the traveling plate, has to be limited to a small range.

To solve the problems, the applicant of the present invention has filed a patent application relating to a linkage system with compact link mechanisms having high rigidity and large load capacity (Japanese Patent Application No. 2003-40086).

The linkage system includes three or more link mechanisms. Each link mechanism consists of end links rotatably coupled to link hubs of input and output members, respectively, and a center link to which the end links are rotatably coupled, and is geometrically identical with respect to the center cross-sectional plane on the input and output sides. Each link mechanism forms a three-link chain with four revolute joints.

In this linkage system, bearing structure is built in the link hubs, wherein outer rings of the bearing are embedded in the link hubs while inner rings of the bearing are coupled to the end links. Rotary transmission components are disposed in the space left in the link mechanisms, where drive mechanisms such as actuators are also placed for position control of the end links through the rotary transmission components, so that the output-side link hub is moved with two degrees of freedom, by driving the rotary transmission components, relative to the stationary input-side link hub.

While the linkage system is obviously operated by controlling the rotation angles of the end links, the previous patent application did not show any specific control method, nor the methods of how to determine the orientation of the output-side link hub from input rotation angles of the input-side link hub, or how to determine the rotation angles of the input-side link hubs from input data regarding the orientation of the output-side link hub.

Consequently, the present applicant has filed another patent application (Japanese Patent Application No. 2003-287945) based on the previous application (Japanese Patent Application No. 2003-40086), relating to a linkage system in which the methods of determining the orientation of the output-side link hub from input rotation angles of the input-side link hub or the rotation angles of the input-side link hubs from input data regarding the orientation of the output-side link hub.

However, there is still scope of improvement in the link mechanisms shown in these patent applications. For example, the rigidity of the link mechanism is not satisfactorily high because of cantilevered structure at the revolute joints thereof. The assemblability of the link mechanism is poor because the input-side and output-side link hubs, end links, and center links are coupled to each other with revolute joints. Furthermore, because these parts each have a complex shape, they do not lend themselves to be readily produced.

In the linkage system, the rotary transmission components are disposed in the space left in the link mechanism and the actuators for position control of the end links are provided through the rotary transmission components. Another problem was that there was little freedom of installation of the rotary transmission components and actuators because the space left in the link mechanism was small. It was hard to install other necessary parts that were large, such as rotation angle sensing means for measuring rotational angles of the input-side end links.

SUMMARY OF THE INVENTION

Based on the foregoing, an object of the present invention is to provide a linkage system that offers high rigidity and good assemblability and producibility, and enables parts such as rotary transmission components and actuators to be readily installed.

To achieve the object, the invention provides a linkage system including an input member disposed on an input side, an output member disposed on an output side, and three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link, the link mechanism being geometrically identical with respect to a center cross-sectional plane relative on the input and output sides, wherein each of the revolute joints of the link mechanism includes bearings that support at both ends of the revolute joint.

The bearings that support at both ends of each revolute joint of the link mechanism improve the rigidity at the bearings and of the link mechanism itself. The bearing structure enables the link mechanism components to be detachable at parts other than the revolute joints and improves assemblability and producibility of the link mechanisms, which in turn enables size reduction of the link mechanisms.

The revolute joints of the link mechanism may preferably be detachable from the links. This makes it possible to disassemble the bearings in the revolute joints into separate units. Each component can then have a simple shape and be produced more easily, leading to improved mass-producibility.

The three or more link mechanisms disposed between the input and output sides are geometrically identical with each other so as to construct a mechanism with two degrees of freedom. "Geometrically identical with respect to the center cross-sectional plane on the input and output sides" means that each link mechanism is geometrically identical on the input and output sides if it is divided along the symmetrical plane of the center link.

Each link forms a three-link chain with four revolute joints. The end links on both input and output sides share the same center, each end link being equally distanced from the center, forming a spherical linkage. The centers of the spherical linkages of the three or more link mechanisms are coincide with one another. The two coupling shafts of the revolute joints at both ends of the center links for connecting the end links can either be arranged at an angle or parallel with each other. Either way, all the center links have a geometrically identical construction to one another.

It is desirable that rotation angle sensing means for measuring the rotation angle of the end links be provided at the revolute joints between the input member and preferably two or more end links. The rotation angle sensing means may include a sensor and a sensed part respectively placed in a rotating part and a stationary part opposite each other so as to save installation space. Actuators are connected to the end links on the input side through rotary transmission components. Using the following equation, orientation control of the output member can be achieved by reverse conversion, or reversely, the orientation of the output member can be determined from the equation. The equation represents the correlation between the orientation of the output member defined by its bending angle $\theta$ and revolution angle $\phi$ and rotation angles $\beta n$ of the end links on the input side:

$$\cos(\theta/2)\sin \beta n - \sin(\theta/2)\sin(\phi+\delta n)\cos \beta n + \sin(\gamma/2) = 0$$

where $\gamma$ is an axial angle between the two coupling shafts at both ends of the center links, and $\delta$ is a distance angle of circumferential distance of each end link from a reference end link.

The "bending angle $\theta$" of the orientation of the output member is the inclination angle of the output member from the vertical center axis of the input member, and the "revolution angle $\phi$" thereof is the rotation angle in a horizontal plane of the inclined output member relative to the center axis of the input member. The "rotation angle $\beta n$" thereof is the turning angle of the end link at one end that is rotatably connected to the input member. The "axial angle $\gamma$" thereof is the angle between the coupling shaft of a revolute joint at one end of a center link rotatably coupled to the end link on the input side and the coupling shaft of a revolute joint at the other end of the center link rotatably coupled to the end link on the output side. The "distance angle $\delta$" thereof is the angle between the shafts of the revolute joints of circumferentially arranged end links coupled to the input member, and defines the circumferential distance of each end link from a reference end link. "Reverse conversion using the equation" means inputting target values that define the orientation of the output member in the equation to obtain necessary rotation angles of the end links on the input side.

Any one of the input member and the output member should preferably include a rotating mechanism that makes the output member rotate around its center axis so as to enable the output member to move with three degrees of freedom by adding a degree of rotation freedom to the two degrees of freedom. It is desirable that this rotating mechanism also include rotation angle sensing means.

If the rotating mechanism is provided to the input member in the mechanism with three degrees of freedom, the orientation of the output member in the link coordinate is defined by the bending angle $\theta_L$, the revolution angle $\phi_L$, and a surface rotation angle $\eta_L$ of the output member. In this case, the correlation between the orientation of the output member and the rotation angles $\beta n$ of the end links on the input side is represented by the following equations:

$$\cos(\theta_L/2)\sin \beta n - \sin(\theta_L/2)\sin(\phi_L+\delta n)\cos \beta n + \sin(\gamma/2) = 0$$

where $\gamma$ is the axial angle between the two coupling shafts at both ends of the center links, and $\delta$ is the distance angle of circumferential distance of each end link from a reference end link; and $\eta_L = \phi_L$. Orientation control of the output member is achieved by reverse conversion using the equation, or reversely, the orientation (three degrees of freedom) of the output member is determined from the equation.

In a global coordinate system, the orientation of the output member (the bending angle $\theta_G$, the revolution angle $\phi_G$, and the surface rotation angle $\eta_G$) is $\theta_G = \theta_L$, $\phi_G = \phi_L + m$, $\eta_G = \eta_L$, where m is the rotation angle of the input member.

If the rotating mechanism is provided to the output member in the mechanism with three degrees of freedom, the orientation of the output member in the link coordinate is defined by the bending angle $\theta_L$, the revolution angle $\phi_L$, and the surface rotation angle $\eta_L$ of the output member. The correlation between the orientation of the output member, the rotation angles $\beta n$ of the end links on the input side, and the rotation angle m of the output member is represented by the following equations:

$$\cos(\theta_L/2)\sin \beta n - \sin(\theta_L/2)\sin(\phi_L+\delta n)\cos \beta n + \sin(\delta/2) = 0$$

where $\gamma$ is the axial angle between the two coupling shafts at both ends of the center links, and $\delta$ is the distance angle of circumferential distance of each end link from a reference end link; and $\eta_L = m$. Orientation control of the output member is achieved by reverse conversion using the equation, or reversely, the orientation (three degrees of freedom) of the output member is determined from the equation.

In the foregoing configurations, a linear drive mechanism can be provided to any one of the input member, the output member, and the center links, to achieve end position control of the output member whereby a member attached to the output member can more readily be contacted with a predetermined point.

Furthermore, it is desirable that any one of the input and output members include a torque sensor so as to detect torque input from the other one that is not provided with the sensor. For example, a torque sensor can be provided to the input member to detect torsion torque of the output member.

BRIEF DESCRIPTION OF THE DRAWINGS

In the accompanying drawings.

DETAILED DESCRIPTION OF THE PREFERRED EMBODIMENTS

Figure 1:
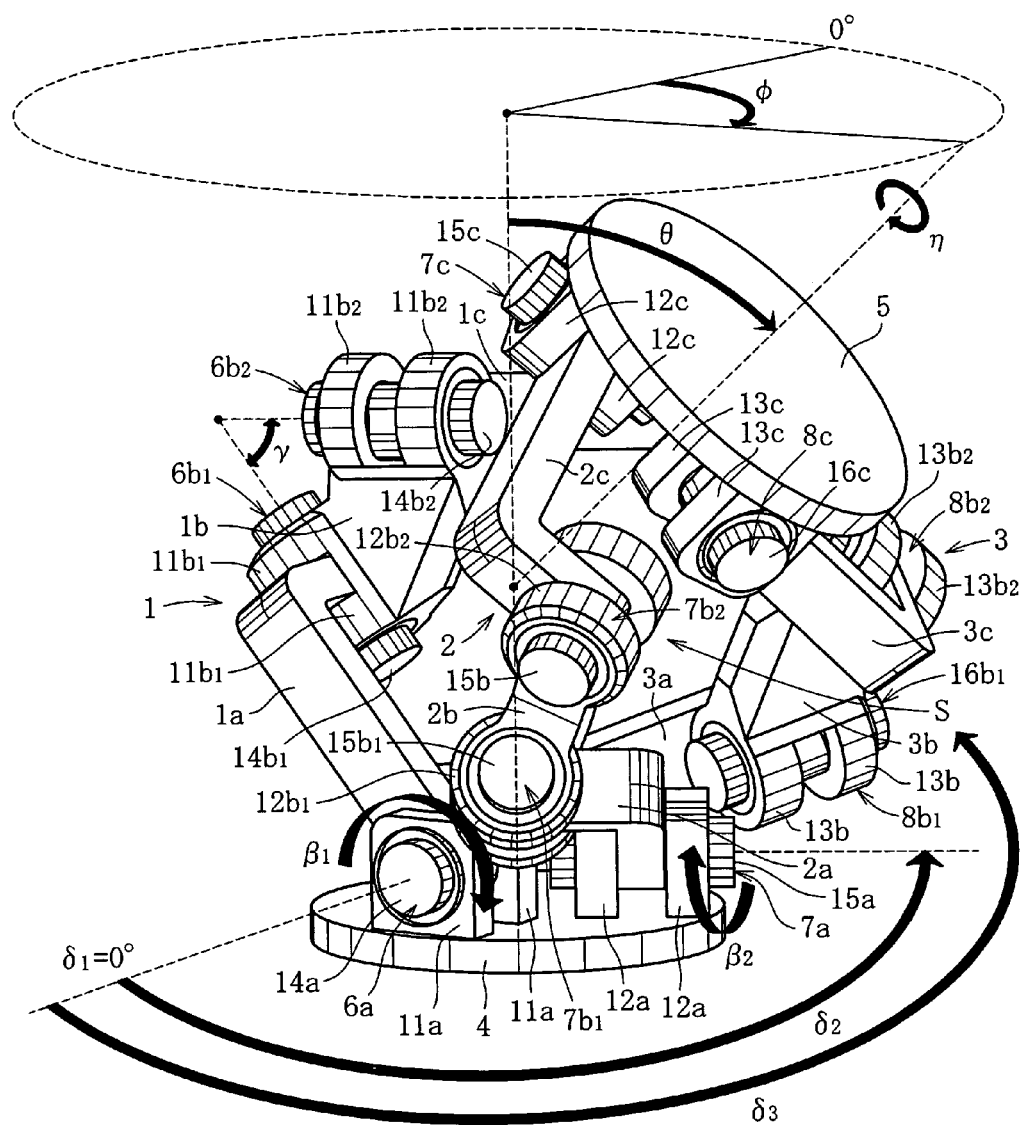
FIG. 1 is a perspective view of one embodiment of a rotation symmetry type linkage system of the invention having three link mechanisms.
Figure 2:
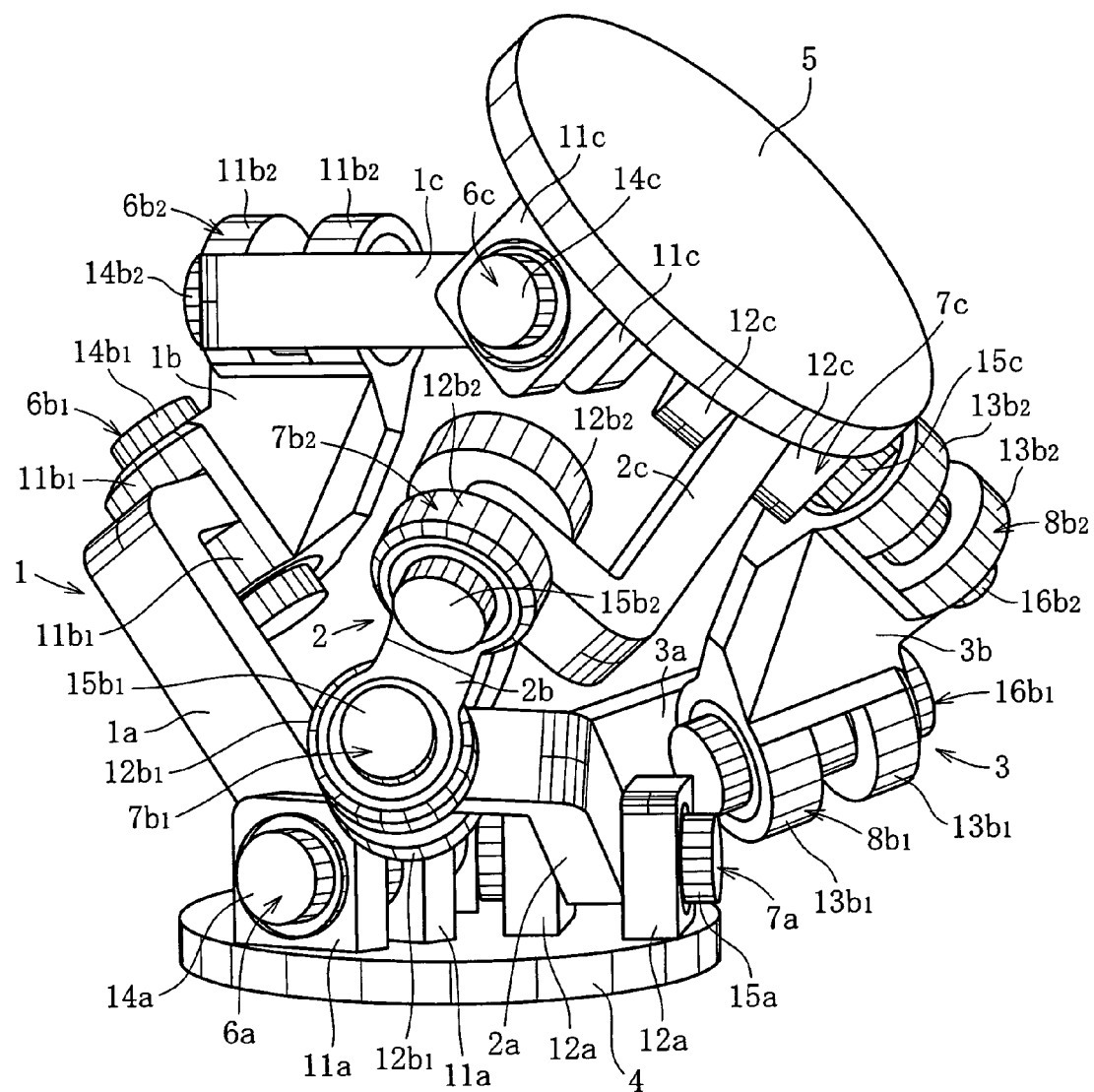
FIG. 2 is a perspective view of one embodiment of a mirror symmetry type linkage system of the invention having three link mechanisms.

FIGS. 1 and 2 show linkage systems of the invention used, for example, for a joint of an articulated robot that performs complex processing or handling of goods in a three-dimensional space at high speed and with high precision. The system includes three sets of link mechanisms 1 to 3, which have a geometrically identical construction to one another. The basic structure of the link mechanisms 1 to 3 is as disclosed in the Japanese Patent Application No. 2003-40086 previously filed by the present applicant.

As shown in FIGS. 1 and 2, the link mechanism 1 (2, 3) forms a three-link chain, including an end link 1a (2a, 3a) provided on the input side and rotatably coupled to a disk-like input member 4, an end link 1c (2c, 3c) provided on the output side and rotatably coupled to a disk-like output member 5, a center link 1b (2b, 3b) rotatably coupled to both the end links 1a (2a, 3a) and 1c (2c, 3c) to connect both the end links, and four revolute joints 6a (7a, 8a), 6$b_1$ (7$b_1$, 8$b_1$), 6$b_2$ (7$b_2$, 8$b_2$), and 6c (7c, 8c).

The end links 1a to 3a and 1c and 3c of the three link mechanisms 1 and 3 share the same center, each link being equally distanced from the center, forming a spherical linkage. The two coupling shafts of the revolute joints 6$b_1$ and 6$b_2$ (7$b_1$ and 7$b_2$, 8$b_1$ and 8$b_2$) at both ends of the center link 1b (2b, 3b) coupled to the end links 1a and 1c (2a and 2c, 3a and 3c) may be arranged at an angle, or arranged parallel with each other. Either way, all the center links 1b to 3b have a geometrically identical construction to one another.

FIG. 1 shows one embodiment wherein the link mechanisms 1 to 3 are of a rotation symmetry type. The input member 4 and the end links 1a to 3a on the input side are positioned in rotation symmetry with the output member 5 and the end links 1c to 3c on the output side, relative to the center lines of the center links 1b to 3b. The drawing shows a state wherein the output member 5 is angled to the input member 4 with a certain operational angle.

FIG. 2 shows one embodiment wherein the link mechanisms 1 to 3 are of a mirror symmetry type. The input member 4 and the end links 1a to 3a on the input side are positioned in mirror symmetry with the output member 5 and the end links 1c to 3c on the output side, relative to the center lines of the center links 1b to 3b. The drawing shows a state wherein the output member 5 is angled to the input member 4 with a certain operational angle.

Figure 3:
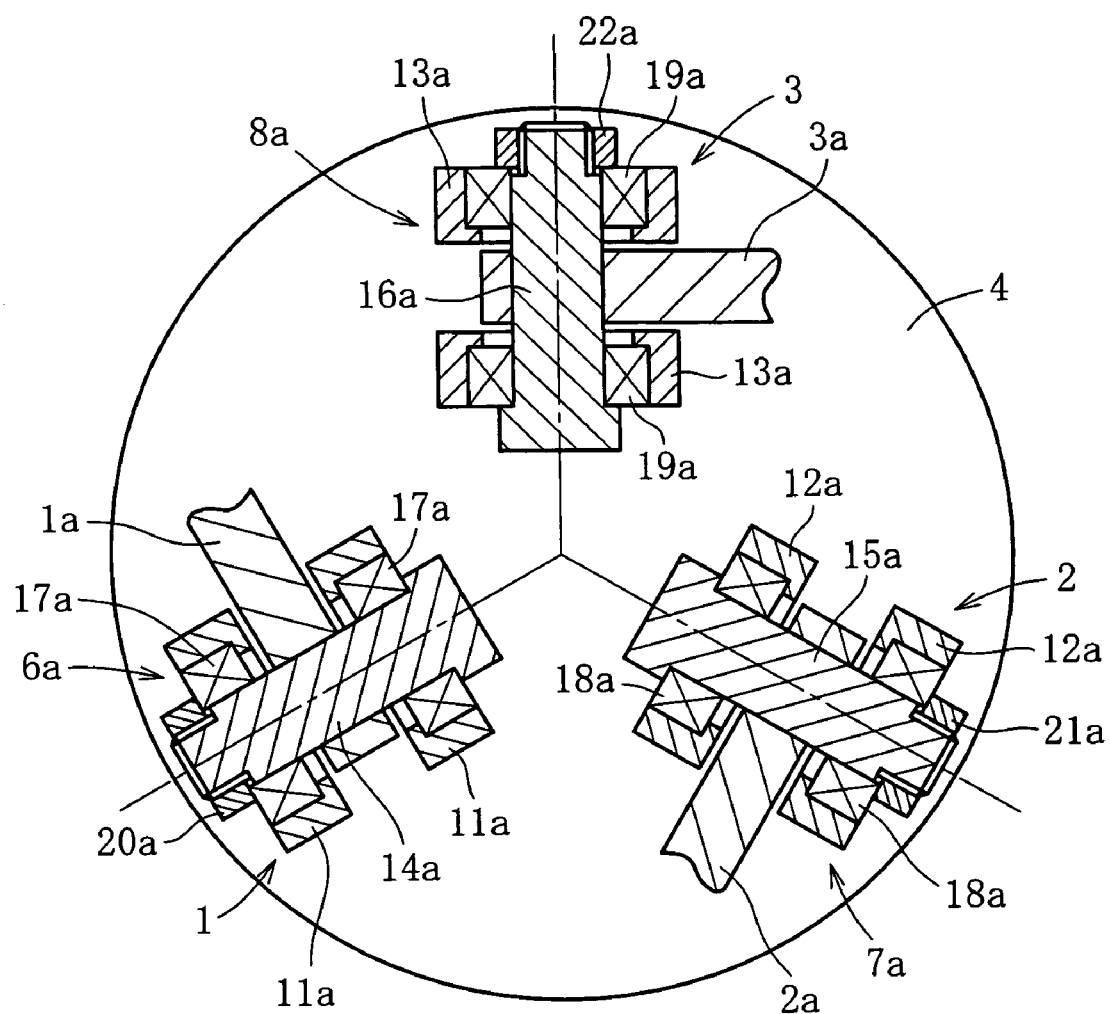
FIG. 3 is a cross-sectional view of revolute joints between the input member and end links on the input side of the linkage systems of FIGS. 1 and 2.

FIG. 3 shows the revolute joints 6a to 8a between the end links 1a to 3a on the input side and the input member 4 of the above two embodiments. On the top face of the disk-like input member 4 are disposed three pairs of support members 11a to 13a for the respective link mechanisms 1 to 3. Each pair of the support members 11a (12a, 13a) is provided with bearings 17a (18a, 19a) that rotatably support a shaft 14a (15a, 16a). One arm end of each end link 1a (2a, 3a), which is L-shaped, is coupled to the shaft 14a (15a, 16a) between the pair of support members 11a (12a, 13a). The support members 11a to 13a are detachably attached to the input member 4 using screws or the like, but they can be formed integrally with the input member 4.

The arm end of the end link 1a (2a, 3a) is fixed to the shaft 14a (15a, 16a) using setscrews. One end of the shaft 14a (15a, 16a) is fastened to the bearings 17a (18a, 19a) with some preload by tightening with a nut 20a (21a, 22a) and a washer.

The support members 11a to 13a need not be equally located in circumferential direction, but the circumferential positions of the support members on the input member 4 must be matched with those of the support members on the output member 5. The input member 4 and the output member 5 are shared by the three link mechanisms 1 to 3, the end links 1a to 3a and 1c to 3c being coupled to their respective support members 11a to 13a and 11c to 13c. While the input member 4 and output member 5 are illustrated as disks, they can be of any shape as long as they have enough space for the support members 11a to 13a, and 11c to 13c. They can be formed with through holes for the purpose of wiring.

The description of the output-side revolute joints 6c to 8c that couple the output member 5 with the end links 1c to 3c on the output side will be omitted as they have the same structure as that of the input-side revolute joints 6a to 8a.

The other arm end of the end link 1a (2a, 3a) on the input side is coupled to one end of the substantially L-shaped center link 1b (2b, 3b) at the revolute joint 6$b_1$ (7$b_1$, 8$b_1$). A pair of support members 11$b_1$ (12$b_1$, 13$b_1$) is provided to the one end of the center link 1b (2b, 3b). Bearings (not shown) are attached to the pair of support members 11$b_1$ (12$b_1$, 13$b_1$) and rotatably support a shaft 14$b_1$ (15$b_1$, 16$b_1$). The other arm end of the L-shaped end link 1a (2a, 3a) is coupled to the shaft 14$b_1$ (15$b_1$, 16$b_1$) between the pair of support members 11$b_1$ (12$b_1$, 13$b_1$). The support members 11$b_1$ (12$b_1$, 13$b_1$) are detachably attached to the center link 1b (2b, 3b) using screws or the like, but they can be formed integrally with the center link.

The arm ends of the end links 1a to 3a are fixed to the shafts 14$b_1$, to 16$b_1$ using setscrews. Instead, they can be fixed using keys or D-cut shafts. One end of the shafts 14$b_1$ to 16$b_1$ is fastened to the bearings with some preload by tightening with nuts and washers.

The description of the revolute joints 6$b_2$ to 8$b_2$ that couple the other arm ends of the end links 1c to 3c on the output side with the other ends of the center links 1b to 3b will be omitted as they have the same structure as that of the revolute joints 6$b_1$ to 8$b_1$.

In the link mechanisms 1 to 3, when the angle and length of the shafts 14a to 16a and the geometrical construction of the input end links 1a to 3a on the input side are identical with those on the output side, and the center links 1b to 3b have the same shape on both the input and output sides, and when the end links 1a to 3a on the input side are coupled to the input member 4 and to the center links 1b and 3b at the same angular positions as those on the output side relative to the symmetrical plane of the center links 1b to 3b, then the input member 4 and the end links 1a to 3a on the input side move identically with the output member 5 and the end links 1c to 3c on the output side due to its geometrical symmetry, rotating at the same speed with the same rotation angle on both the input and output sides. The symmetrical plane of the center links 1b to 3b is here called "constant velocity bisecting plane."

As the center links 1b to 3b move along the constant velocity bisecting plane, the circumferentially arranged, geometrically identical link mechanisms 1 to 3 between the input member 4 and output member 5 can move without interfering with each other, the end links rotating at the same speed on both the input and output sides at any angle.

Because of the bearing structure of the four revolute joints 6a to 8a, 6$b_1$ to 8$b_1$, 6$b_2$ to 8$b_2$, and 6c to 8c, namely, the coupling portions between the input member 4 and the end links 1a to 3a, between the input-side end links 1a to 3a and the center links 1b to 3b, between the center links 1b to 3b and the output-side end links 1c to 3c, and between the output-side end links 1c to 3c and the output member 5, of the respective link mechanisms 1 to 3, friction resistance or rotation resistance at the coupling portions is reduced, whereby smooth power transmission is secured and durability improved. The bearing structure offers improved rigidity as it provides support at both ends in the revolute joints 6a to 8a, $6b_1$ to $8b_1$, $6b_2$ to $8b_2$, and 6c to 8c. Furthermore, the structure enables the link components to be detachable at parts other than the revolute joints, offering better assemblability.

Figure 4:
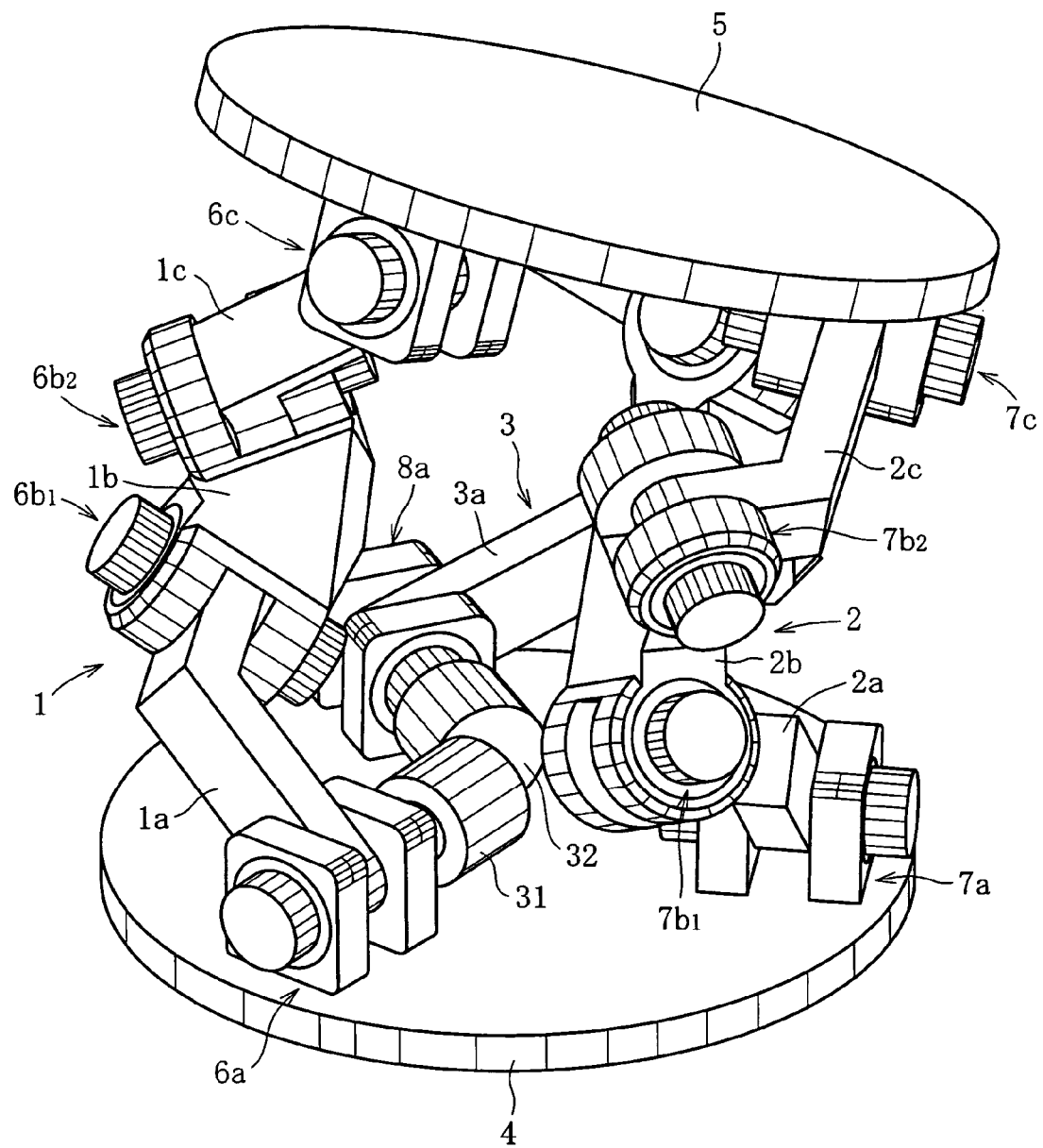
FIG. 4 is a perspective view of one embodiment of a linkage system provided with actuators on the input side.
Figure 5:
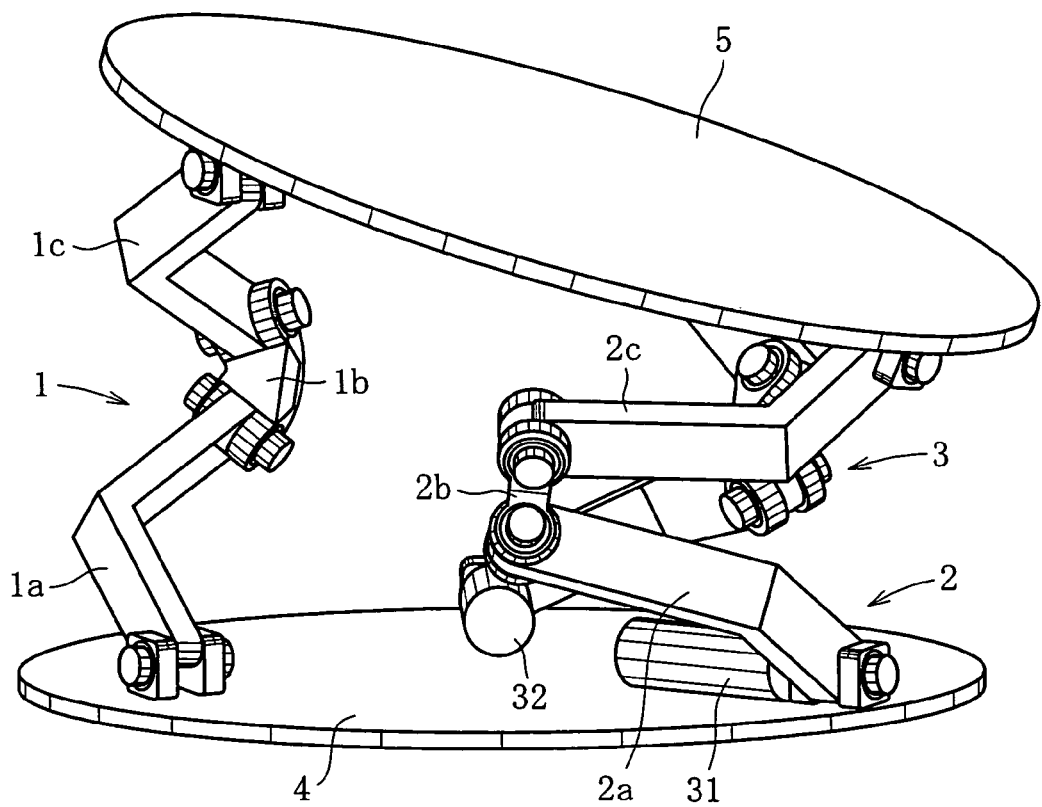
FIG. 5 is a perspective view of another embodiment of a linkage system with link mechanisms having non-right angled arms.
Figure 6:
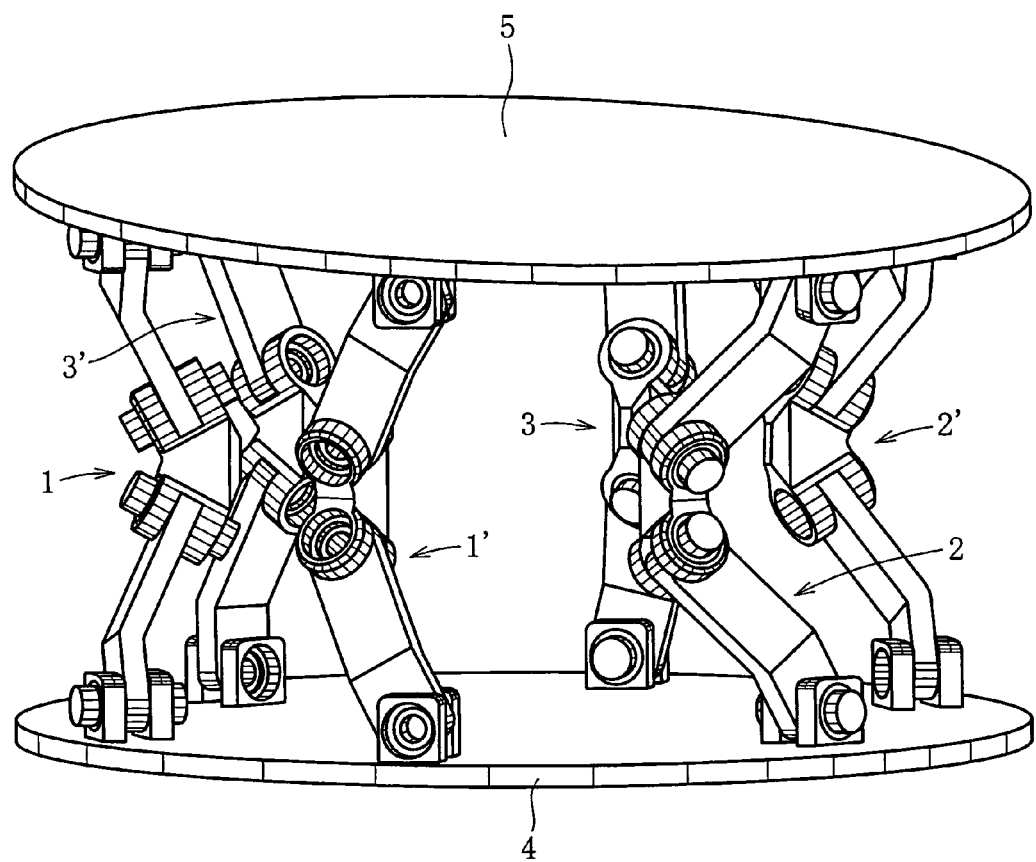
FIG. 6 is a perspective view of still another embodiment of a linkage system with six link mechanisms.

FIGS. 4 and 5 show linkage systems wherein actuators 31 and 32 are provided to two of the input end links 1a and 3a (2a and 3a in FIG. 5). The link mechanisms 1 to 3 are of a mirror symmetry type. The input member 4 and the output member 5 are larger and the revolute joints 6a to 8a, and 6c to 8c are wider in this embodiment. The rotation axes of the revolute joints $6b_2$ to $8b_2$ that couple the end links 1c to 3c and the center links 1b to 3b are all oriented toward the center axis of the input member 4. Therefore, while the angle between the shafts at both arm ends of each end link is not 90°, the input side and the output side of each end link are geometrically identical. (In the case where this angle is not 90°, the equation to be described later is not valid relating to the end links 1a to 3a and the orientation of the output member 5.) Thus the end links 1a to 3a, and 1c to 3c and the center links 1b to 3b can move without interfering with each other. In these embodiments, also, the link mechanisms 1 to 3 form a larger space S inside, enabling easy installation of various parts such as actuators and rotation angle sensing means, and offering high stability because of enlarged center of gravity (see FIG. 5). FIG. 6 shows a linkage system having six link mechanisms 1 to 3, and 1' to 3' to enlarge the area of center of gravity and to increase rigidity.

In the embodiments shown in FIGS. 4 and 5, the shafts 14a to 16a coupled to the arm ends of the end links 1a to 3a on the input side are coaxially connected to the output shafts of actuators such as motors. A movable part, for example, a robot arm (not shown) mounted on the output member 5 is manipulated by controlling the rotation angles of the end links 1a to 3a using these actuators.

Alternatively, the actuators for rotation angle control can be connected to the revolute joints 6a to 8a between the input member 4 and the end links 1a to 3a on the input side via rotary transmission components (not shown). For example, an actuator such as a motor can be connected to a gear attached to one end of the shaft 14a (15a, 16a) supported by the support members 11a (12a, 13a) with the bearings 17a (18a, 19a). The actuator that is accommodated in a housing (not shown) can be placed below the input member 4 and connected to the gear through a hole formed in the input member 4.

In another embodiment, rotation angle sensors (not shown) are provided to the shafts 14a to 16a supporting the input-side end links 1a to 3a, respectively. Using such sensors makes the actuators more compact as they do not then need a servo mechanism, and makes it unnecessary to determine the position of the origin each time power is turned on.

The shafts 14a to 16a are supported by inner (rotating) rings of the bearings 17a to 19a, and the outer (non-rotating) rings of the bearings 17a to 19a are fixed to the support members 11a to 13a of the input member 4. The rotation angle sensor consists of a sensed part provided to the inner end of the shaft 14a (15a, 16a) and a sensor mounted on the input member 4 opposite the sensed part. While the sensed part is disposed on the rotating side and the sensor on the stationary side in this embodiment, the sensor can be mounted on the rotating side and the sensed part on the stationary side because the sensed part rotates only within the range of about ±45°.

The sensed part is a radial type and consists, for example, of an annular back metal and a magnetic member at the outer periphery of the back metal having alternating N and S poles, the back metal being fixedly attached to the shaft 14a (15a, 16a). The magnetic member is, for example, a rubber magnet, which can be bonded to the back metal by curing adhesion. The sensed part can also be a plastic magnet or a sintered magnet, in which case the back metal is not absolutely necessary.

The sensor consists of a magnetic sensor that is activated by a unipolar or alternating magnetic field and generates a square wave output signal corresponding to magnetic flux density. The magnetic sensor is mounted on a magnetic sensor circuit board (not shown), which is encapsulated in a resin case and resin-molded. The resin case that accommodates the magnetic sensor and the circuit board is fixedly attached to the input member 4. The circuit board includes circuitry for controlling power supply to the magnetic sensor and for processing output signals from the sensor for signal output. Wiring can be provided in the inner space surrounded by the link mechanisms.

When the sensed part rotates with the rotation of the shaft 14a (15a, 16a), the sensor generates output signals corresponding to the density of magnetic flux generated by the magnetic member, so that the rotation angle of the shaft 14a (15a, 16a), i.e., of the end link 1a (2a, 3a) is determined. While the magnetic sensor of this embodiment functions as an encoder that generates A-phase or Z-phase output signal, the sensor can include another magnetic sensor so that it functions as the encoder generating A/B-phase or A/B/Z-phase output signal. Other means or methods, for example, the means of sensing an absolute rotation angle shown in Japanese Patent Laid-Open Publication No. 2003-148999, or a coil sensor such as an optical fiber sensor or a resolver sensor, can be employed for the sensed part and the sensor for use in the present invention.

Referring back to FIG. 1, the orientation of the output member 5 is defined by its bending angle θ and revolution angle φ. Here, the correlation between the orientation of the output member 5 and the rotation angles βn of the input-side end links 1a to 3a is expressed as follows:

$$\cos(\theta/2)\sin\beta n - \sin(\theta/2)\sin(\phi+\delta n)\cos\beta n + \sin(\gamma/2) = 0$$

where γ is an axial angle between the two coupling shafts at both ends of the center links, and δ is a distance angle of circumferential distance of each end link from a reference end link. Using this equation, orientation control of the output member 5 is achieved by reverse conversion.

In other words, the orientation of the output member 5 can be defined by two degrees of freedom (bending angle θ and revolution angle φ).

More specifically, when the linkage system includes three link mechanisms 1 to 3 and the end links 1a to 3a and 1c to 3c are circumferentially equally distanced from each other as in this embodiment, the correlation between the orientation of the output member 5 (bending angle θ and revolution angle φ) and the rotation angles βn of the end links on the input side is defined by the following equations (where θ is the angle from vertical of the output member 5 relative to the input member 4, φ is the rotation angle from 0° in horizontal plane of the output member 5 relative to the input member 4, $\beta_1$ and $\beta_2$ are the rotation angles of two of the three input-side end links 1a to 3a at the revolute joints 6a to 8a, γ is the angle between the shafts of the revolute joints $6b_1$ to $8b_1$ and $6b_2$ to $8b_2$ at both ends of the center links $1b$-$3b$ respectively coupled with the input-side and output-side end links $1a$ to $3a$ and $1c$ to $3c$:

$$\cos(\theta/2)\sin\beta_1 - \sin(\theta/2)\sin\phi\cos\beta_1 + \sin(\gamma/2) = 0$$
$$\cos(\theta/2)\sin\beta_2 - \sin(\theta/2)\sin(\phi + 120°)\cos\beta_2 + \sin(\gamma/2) = 0$$
$$\cos(\theta/2)\sin\beta_3 - \sin(\theta/2)\sin(\phi + 120°)\cos\beta_3 + \sin(\gamma/2) = 0.$$

Orientation control of the output member 5 is achieved by reverse conversion using the equations, namely, by inputting target values $\theta$ and $\phi$ for defining a predetermined orientation and solving two or more of the above equations so as to obtain necessary rotation angles of the input-side end links $1a$ to $3a$ corresponding to the input orientation.

Reversely, the orientation of the output member 5 is determined from the equations, namely, by inputting measured rotation angles of the input-side end links $1a$ to $3a$ in the equations.

In case of adopting a stationary input member 4, revolutions of the output member 5 at a large bending angle relative to the stationary input member 4 requires a large torque. When the output member 5 revolves at a constant bending angle from the vertical, the surface of the output member 5 also rotates, resulting in change in the direction of components mounted on the output member 5. In order to solve the above-mentioned problem, by providing an additional actuator (not shown) to the input member 4 for the purpose of rotating the input member 4 in addition to the two degrees of freedom of the link mechanisms 1 to 3, the output member 5 can be operated with three degrees of freedom. In such a mechanism with three degrees of freedom, the surface angle of the output member 5 can then be changed without changing the orientation of the link mechanisms 1 to 3.

The orientation of the output member 5 in a link coordinate of this mechanism with three degrees of freedom is defined by its bending angle $\theta_L$, revolution angle $\phi_L$, and surface rotation angle $\eta_L$. The following equations represent the correlation between the orientation of the output member 5 and the rotation angles $\beta n$ of the input-side end links $1a$ to $3a$:

$$\cos(\theta_L/2)\sin\beta n - \sin(\theta_L/2)\sin(\phi_L + \delta n)\cos\beta n + \sin(\gamma/2) = 0$$

where $\gamma$ is an axial angle between the two coupling shafts at both ends of the center links, and $\delta$ is a distance angle of circumferential distance of each end link from a reference end link; and $\eta_L = \phi_L$. Orientation control of the output member 5 in the link coordinate is achieved by reverse conversion using these equations.

In a global coordinate system, the orientation of the output member 5 (the bending angle $\theta_G$, the revolution angle $\phi_G$, and the surface rotation angle $\eta_G$) is $\theta_G = \theta_L$, $\phi_G = \phi_L + m$, $\eta_G = \eta_L$, where m is the rotation angle of the input member.

Reversely, the orientation of the output member 5 in the mechanism with three degrees of freedom is determined from the equations by inputting measured rotation angles of the input-side end links $1a$ to $3a$ in the equations.

Alternatively, the actuator mentioned above can be provided to the output member 5. In this case, the orientation of the output member in the link coordinate is defined by the bending angle $\theta_L$, the revolution angle $\phi_L$, and the surface rotation angle $\eta_L$ of the output member 5. The correlation between the orientation of the output member 5, the rotation angles $\beta n$ of the end links on the input side, and the rotation angle m of the output member 5 is represented by the following equations:

$$\cos(\theta_L/2)\sin\beta n - \sin(\theta_L/2)\sin(\phi_L + \delta n)\cos\beta n + \sin(\gamma/2) = 0$$

where $\gamma$ is the axial angle between the two coupling shafts at both ends of the center links, and $\delta$ is the distance angle of circumferential distance of each end link from a reference end link; and $\eta_L = m$. Likewise, orientation control of the output member 5 is achieved by reverse conversion using these equations. Here, the link coordinate is the same as the global coordinate.

Reversely, the orientation of the output member 5 in the mechanism with three degrees of freedom is determined from these equations by inputting measured rotation angles of the input-side end links $1a$ to $3a$ in the equations.

It is also possible to construct a mechanism with three degrees of freedom by providing a motor-driven linear actuator (not shown) to the output member 5. With a linear actuator, the end position control of the output member 5 is achieved, and the member attached to the output member 5 is more readily contacted with a target point. The linear actuator can be of a pneumatic or hydraulic type. Further, the linear actuator can be provided to, other than the output member 5, the input member 4, or placed between the pair of revolute joints of the center links $1b$ to $3b$, in which case the actuators are all driven a same distance at the same time.

While the mechanism with three degrees of freedom is constructed by adding a rotary or linear motion to the mechanism with two degrees of freedom in the embodiments described above, the invention is not limited thereto. The linkage system can have a mechanism with four degrees of freedom by adding both rotary and linear motions to the mechanism with two degrees of freedom.

What is claimed is:

1. A linkage system comprising:
  an input member disposed on an input side;
  an output member disposed on an output side; and
  three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link, the link mechanism being geometrically identical with respect to a center cross-sectional plane relative on the input and output sides, wherein
  each of the revolute joints of the link mechanism includes bearings that support at both ends of the revolute joint, and
  the orientation of the output member is determined from an equation representing the correlation between the orientation of the output member defined by a bending angle $\theta$ and a revolution angle $\phi$ and rotation angles $\beta n$ of the end links on the input side:

$$\cos(\theta/2)\sin\beta n - \sin(\theta/2)\sin(\phi + \delta n)\cos\beta n + \sin(\gamma/2) = 0$$

where $\gamma$ is an axial angle between the two coupling shafts at both ends of the center links, and $\delta$ is a distance angle of circumferential distance of each end link from a reference end link.

2. A linkage system according to claim 1, wherein the revolute joints of the link mechanism are detachable from the links.

3. A linkage system according to claim 1, wherein
rotation angle sensing means for measuring the rotation angle of the end link are provided at the revolute joints between the input member and two or more end links.

4. A linkage system according to claim 3, wherein
the rotation angle sensing means comprises a sensor and a sensed part respectively placed in a rotating part and a stationary part opposite each other.

5. A linkage system according to claim 2, wherein
rotation angle sensing means for measuring the rotation angle of the end link are provided at the revolute joints between the input member and two or more end links.

6. A linkage system according to claim 5, wherein
the rotation angle sensing means comprises a sensor and a sensed part respectively placed in a rotating part and a stationary part opposite each other.

7. A linkage system according to any one of claims 1, 2, 3, 4, 5, or 6, wherein
actuators are connected to the end links on the input side through rotary transmission components.

8. A linkage system comprising:
an input member disposed on an input side;
an output member disposed on an output side; and
three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link, the link mechanism being geometrically identical with respect to a center cross-sectional plane relative on the input and output sides, wherein
each of the revolute joints of the link mechanism includes bearings that support at both ends of the revolute joint, and
the orientation control of the output member is achieved by reverse conversion using an equation representing the correlation between the orientation of the output member defined by the bending angle θ and the revolution angle φ and the rotation angles βn of the end links on the input side:

$$\cos(\theta/2)\sin \beta n - \sin(\theta/2)\sin(\phi+\delta n)\cos \beta n + \sin(\gamma/2) = 0$$

where γ is the axial angle between the two coupling shafts at both ends of the center links, and δ is the distance angle of circumferential distance of each end link from a reference end link.

9. A linkage system according to any one of claims 1, 2, 3, 4, 5, 6, or 8, wherein
any one of the input member and the output member comprises a rotating mechanism that makes the output member rotate around its center axis.

10. A linkage system according to claim 7, wherein
any one of the input member and the output member comprises a rotating mechanism that makes the output member rotate around its center axis.

11. A linkage system according to claim 9, wherein
the rotating mechanism that makes the output member rotate around its center axis includes rotation angle sensing means for measuring the rotation angle thereof.

12. A linkage system according to claim 10, wherein
the rotating mechanism that makes the output member rotate around its center axis includes rotation angle sensing means for measuring the rotation angle thereof.

13. A linkage system comprising:
an input member disposed on an input side;
an output member disposed on an output side; and
three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link, the link mechanism being geometrically identical with respect to a center cross-sectional plane relative on the input and output sides, wherein
each of the revolute joints of the link mechanism includes bearings that support at both ends of the revolute joint, and
the orientation of the output member is determined from an equation representing the correlation between the orientation of the output member defined by the bending angle $\theta_L$, the revolution angle $\phi_L$, and a surface rotation angle $\eta_L$ of the output member, and the rotation angles βn of the end links on the input side:

$$\cos(\theta_L/2)\sin \beta n - \sin(\theta_L/2)\sin(\phi_L+\delta n)\cos \beta n + \sin(\gamma/2) = 0$$

where γ is the axial angle between the two coupling shafts at both ends of the center links, and δ is the distance angle of the circumferential distance of each end link from a reference end link; and $$\eta_L = \phi_L.$$

14. A linkage system comprising:
an input member disposed on an input side;
an output member disposed on an output side; and
three or more link mechanisms, each link mechanism consisting of end links rotatably coupled to the input member and the output member, respectively, a center link rotatably coupled to the end links on the input side and the output side, and four revolute joints by which the end links are rotatably coupled to the input and output members, and to the center link, the link mechanism being geometrically identical with respect to a center cross-sectional plane relative on the input and output sides, wherein
each of the revolute joints of the link mechanism includes bearings that support at both ends of the revolute joint, and
the orientation of the output member is achieved by reverse conversion using an equation representing the correlation between the orientation of the output member defined by the bending angle $\theta_L$, the revolution angle $\phi_L$, and a surface rotation angle $\eta_L$ of the output member, and the rotation angles βn of the end links on the input side:

$$\cos(\theta_L/2)\sin \beta n - \sin(\theta_L/2)\sin(\phi_L+\delta n)\cos \beta n + \sin(\gamma/2) = 0$$

where γ is the axial angle between the two coupling shafts at both ends of the center links, and δ is the distance angle of the circumferential distance of each end link from a reference end link; and $$\eta_L = \phi_L.$$

15. A linkage system according to any one of claims 1, 2, 3, 4, 5, 6, 8, 13 or 14, wherein
a linear drive mechanism is provided to any one of the input member, the output member, and the center links.

16. A linkage system according to claim 7, wherein
a linear drive mechanism is provided to any one of the input member, the output member, and the center links.

17. A linkage system according to claim 9, wherein
a linear drive mechanism is provided to any one of the input member, the output member, and the center links.

18. A linkage system according to claim 11, wherein
a linear drive mechanism is provided to any one of the input member, the output member, and the center links.

19. A linkage system according to claims 1, 2, 3, 4, 5, 6, 8, 13 or 14, wherein
any one of the input member and the output member include a torque sensor so as to detect torque input from the other one that is not provided with the sensor.

20. A linkage system according to claim 15, wherein
any one of the input member and the output member include a torque sensor so as to detect torque input from the other one that is not provided with the sensor.

21. A linkage system according to claim 17, wherein
any one of the input member and the output member include a torque sensor so as to detect torque input from the other one that is not provided with the sensor.

22. A linkage system according to claim 18, wherein
any one of the input member and the output member include a torque sensor so as to detect torque input from the other one that is not provided with the sensor.

* * * * *